United States Patent
Baek (10) Patent No.: US 8,996,285 B2
(45) Date of Patent: Mar. 31, 2015

(54) SYSTEM FOR DETECTING MALFUNCTION OF VARIABLE VALVE LIFT APPARATUS AND METHOD FOR THE SAME

(71) Applicant: Hyundai Motor Company, Seoul (KR)

(72) Inventor: Hong Kil Baek, Seoul (KR)

(73) Assignee: Hyundai Motor Company, Seoul (KR)

( * ) Notice: Subject to any disclaimer, the term of this patent is extended or adjusted under 35 U.S.C. 154(b) by 336 days.

(21) Appl. No.: 13/718,761

(22) Filed: Dec. 18, 2012

(65) Prior Publication Data

US 2013/0298855 A1    Nov. 14, 2013

(30) Foreign Application Priority Data

May 9, 2012    (KR) .......................... 10-2012-0049139

(51) Int. Cl.
| | |
|---|---|
| F01L 1/34 | (2006.01) |
| F01L 1/14 | (2006.01) |
| F01L 13/00 | (2006.01) |
| G01M 15/00 | (2006.01) |
| F01L 1/053 | (2006.01) |
| G01L 23/22 | (2006.01) |

(52) U.S. Cl.
CPC ............ *F01L 1/34* (2013.01); *F01L 1/0532* (2013.01); *F01L 1/143* (2013.01); *F01L 13/0036* (2013.01); *F01L 2800/11* (2013.01); *F01L 2820/04* (2013.01); *G01L 23/221* (2013.01)

USPC ........................................ 701/114; 123/90.15

(58) Field of Classification Search
USPC ................ 701/114, 102, 101, 115; 123/90.1, 123/90.15–90.18; 73/114.32, 14.02, 14.32
See application file for complete search history.

(56) References Cited

U.S. PATENT DOCUMENTS 6,318,313 B1 * 11/2001 Moriya et al. ............. 123/90.15
7,654,133 B2 * 2/2010 Hoshi et al. ................ 73/114.32

FOREIGN PATENT DOCUMENTS

| JP | 11-281532 A | | 10/1999 | |
| JP | 2001021455 A | * | 1/2001 | ............ G01M 15/00 |
| JP | 2001-10773 A | | 4/2001 | |
| JP | 2004-239242 A | | 8/2004 | |
| KR | 10-2009-0051952 A | | 5/2009 | |

* cited by examiner

*Primary Examiner* — Hieu T Vo
(74) *Attorney, Agent, or Firm* — Morgan, Lewis & Bockius LLP (57) ABSTRACT

A system for detecting malfunction of a variable valve lift apparatus may include an engine provided with the variable valve lift apparatus controlling lift of a valve, a vibration sensor which detects vibrations generated in closing of the valve and outputs corresponding vibration signals, and a control portion which receives the vibration signals and determines the malfunction of the variable valve lift apparatus according to the vibration signals to be detected within a predetermined crank angle.

15 Claims, 8 Drawing Sheets

SYSTEM FOR DETECTING MALFUNCTION OF VARIABLE VALVE LIFT APPARATUS AND METHOD FOR THE SAME

CROSS-REFERENCE TO RELATED APPLICATION

The present application claims priority to Korean Patent Application No. 10-2012-0049139 filed on May 9, 2012, the entire contents of which is incorporated herein for all purposes by this reference.

BACKGROUND OF THE INVENTION

1. Field of the Invention

The present invention relates to a system for detecting malfunction of a variable valve lift apparatus and a method for the same.

2. Description of Related Art

An internal combustion engine generates power by burning fuel in a combustion chamber in air media drawn into the chamber. Intake valves are operated by a camshaft in order to intake the air, and the air is drawn into the combustion chamber while the intake valves are open. In addition, exhaust valves are operated by the camshaft, and a combustion gas is exhausted from the combustion chamber while the exhaust valves are open.

An optimal operation of the intake valves and the exhaust valves depends on a rotation speed of the engine. That is, an optimal lift or optimal opening/closing timing of the valves depends on the rotation speed of the engine. In order to achieve such an optimal valve operation depending on the rotation speed of the engine, various research has been undertaken. For example, research has been undertaken for a variable valve lift (VVL) apparatus that enables different lifts depending on an engine speed.

Despite various advantages of the variable valve lift apparatus, it is difficult to detect operation error of the variable valve lift apparatus.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system for detecting malfunction of a variable valve lift apparatus and a method for the same having advantages of detecting malfunction of a variable valve lift apparatus by detecting vibration due to valve closing.

In an aspect of the present invention, a system for detecting malfunction of a variable valve lift apparatus may include an engine provided with the variable valve lift apparatus controlling lift of a valve, a vibration sensor which detects vibrations generated in closing of the valve and outputs corresponding vibration signals, and a control portion which receives the vibration signals and determines the malfunction of the variable valve lift apparatus according to the vibration signals to be detected within a predetermined crank angle.

The vibration sensor is disposed to a cylinder head of the engine.

The control portion detects one of vibration signals, of which the valve is closed within a first crank angle in a low lift mode and of which the valve is closed within a second crank angle in a high lift mode, and the control portion determines an operation mode of the variable valve lift apparatus.

The control portion determines the malfunction of the variable valve lift apparatus when the one of the vibration signals corresponds to the second crank angle in the low lift mode.

The control portion determines the malfunction of the variable valve lift apparatus when the one of the vibration signals corresponds to the first crank angle in the high lift mode.

The valve is an intake valve.

The valve is an exhaust valve.

In another aspect of the present invention, a method for detecting malfunction of a variable valve lift apparatus may include changing mode of the variable valve lift apparatus from a first mode to a second mode, determining a detection window for detecting a vibration peak in the second mode, detecting the vibration peak in the detection window, and determining the malfunction of the variable valve lift apparatus according to whether the vibration peak is detected in the detection window or not, wherein the vibration peak is generated when a valve provided to the engine is closed, and wherein the detection window is predetermined as a crank angle of a crankshaft provided to the engine.

The variable valve lift apparatus is determined to be in the malfunction when the vibration peak is not detected within the detection window.

The first mode is a low lift mode and the second mode is a high lift mode.

The first mode is a high lift mode and the second mode is a low lift mode.

A plurality of detection windows are predetermined as a plurality of crank angles for detecting the vibration peaks of a plurality of valves provided to each cylinder of the engine.

The vibration peak is detected by a vibration sensor mounted to a cylinder head of the engine.

The valve is an intake valve.

The valve is an exhaust valve.

According to an exemplary embodiment of the present invention, since change modes of the variable valve lift apparatus may be detected by detecting vibration due to closing of a valve, exact detection of the malfunction may be realized.

Even malfunction of one valve of a cylinder of a plurality of cylinder occurs, it may be detected easily.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In addition, unless explicitly described to the contrary, the word "include" and variations such as "includes" or "including", will be understood to imply the inclusion of stated elements but not the exclusion of any other elements.

Figure 1:
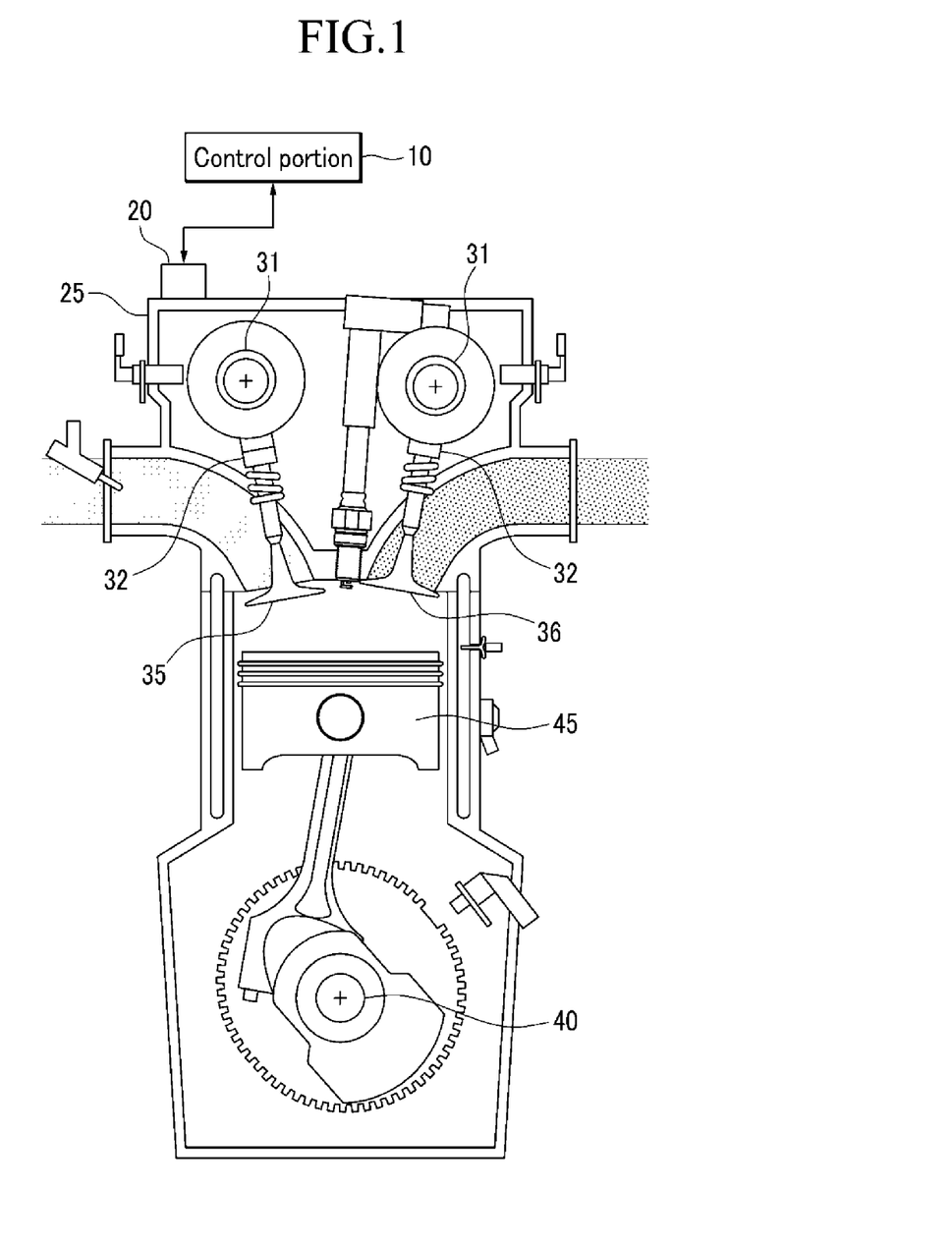
FIG. 1 is a drawing showing a system for detecting malfunction of a variable valve lift apparatus provided to an engine according to an exemplary embodiment of the present invention.

FIG. 1 is a drawing showing a system for detecting malfunction of a variable valve lift apparatus provided to an engine according to an exemplary embodiment of the present invention.

Referring to FIG. 1, separate strokes—intake, compression, power, and exhaust-of a four stroke engine change reciprocal motion of a piston 45 to rotation of a crankshaft 40.

An intake valve 35 and an exhaust valve 36 of the engine controls flowing of intake and exhaust within a cylinder and seals tight the cylinder.

A system for detecting malfunction of a variable valve lift apparatus according to an exemplary embodiment of the present invention may be applied to engines with various valve types.

The intake valve 35 and the exhaust valve 36 are opened and closed according to rotation of the crankshaft 40.

A variable tappet 32 may realize a low lift mode and high lift mode. The variable tappet 32 will be described as one example of the variable valve lift apparatus. The system for detecting malfunction of a variable valve lift apparatus according to an exemplary embodiment of the present invention may be applied to other types of variable valve lift apparatuses accordingly.

A vibration sensor 20 is mounted to a cylinder head 25. The vibration sensor 20 detects vibration of the valves 35 and 36 in closing and outputs corresponding signals to a control portion 10.

The vibration sensor 20 may be a piezoelectric sensor, an optical fiber sensor, a moving coil-type vibration sensor, a seismo-type sensor, a magnetic induction-type displacement sensor and so on.

The control portion 10 may be an ECU (Engine Control Unit) which controls overall process of the engine.

The control portion 10 detects and determines malfunction of the variable valve lift apparatus using the vibration signal. The control portion 10 detects and determines malfunction of the variable valve lift apparatus according to whether the vibration signal of the closing of the intake valve 35 is detected within predetermined crank angles or not. The crank angle means that rotation angle of the crankshaft 40.

A method for detecting malfunction of a variable valve lift apparatus will be described in detailed later.

Naturally, the control portion 10 detects and determines malfunction of the variable valve lift apparatus according to whether the vibration signal of the closing of the exhaust valve 36 is detected within predetermined crank angles or not.

Figure 2:
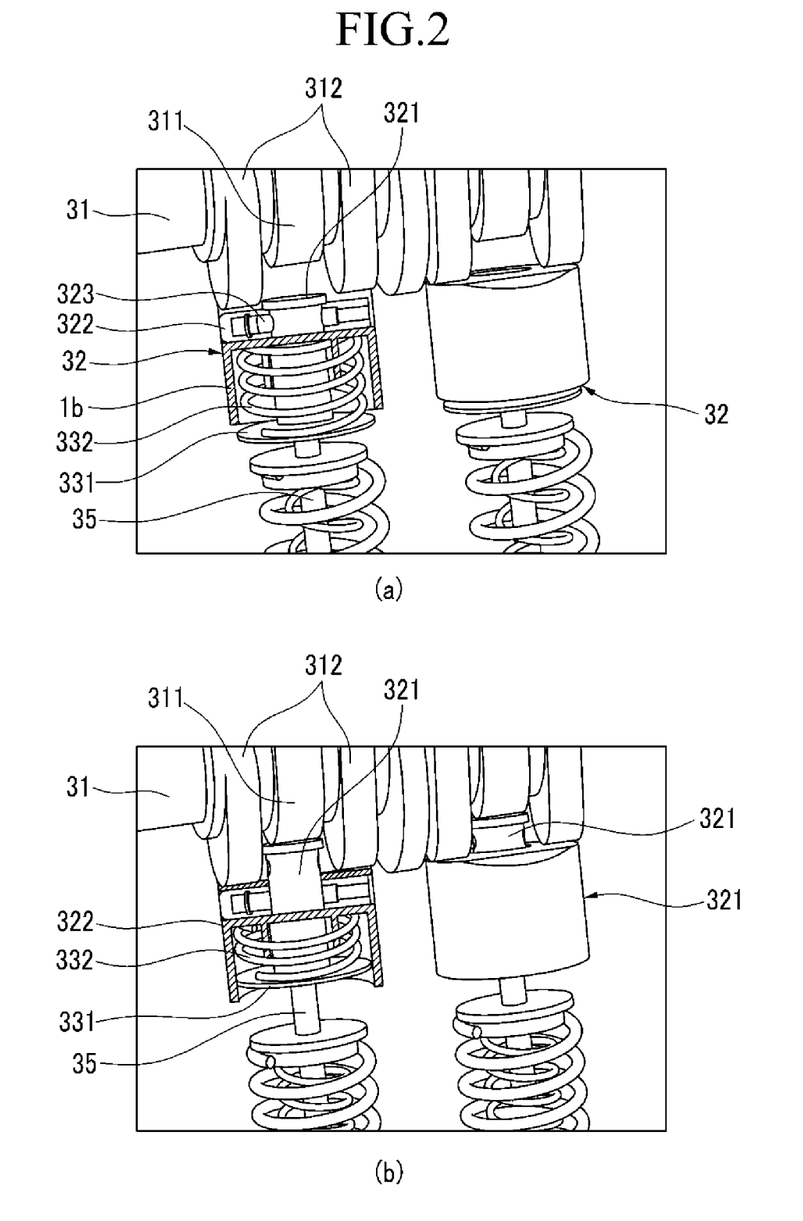
FIG. 2 is a drawing showing operation of a variable valve lift apparatus of which a system and a method for detecting operation error according to an exemplary embodiment of the present invention may be applied thereto.

FIG. 2 is a drawing showing operation of a variable valve lift apparatus of which a system and a method for detecting operation error according to an exemplary embodiment of the present invention may be applied thereto.

Referring to FIG. 2, the variable valve lift apparatus includes a camshaft 31, a low lift cam 311 and a high lift cam 312 disposed to the camshaft 31, and a variable tappet 32.

The variable tappet 32 includes an inner tappet body 321 and an outer tappet body 322.

The outer tappet body 322 always contacts the high lift cam 312, and the inner tappet body 321 selectively contacts the low lift cam 311.

The intake valve 35 connected with the inner tappet body 321 is provided with a spring seat 331. A lost motion spring 332 is disposed between the outer tappet body 322 and the spring seat 331 for biasing the outer tappet body 322.

A latching pin 323 is disposed to the outer tappet body 322, and is selectively inserted into the inner tappet body 321 according to supplying hydraulic pressure thereto.

When the latching pin 323 is inserted into the inner tappet body 321 as shown (a) of FIG. 2, the variable valve lift apparatus may realize a high lift mode, and the intake valve 35 is opened and closed according to rotation of the high lift cam 312.

When the latching pin 323 is separated from the inner tappet body 321 as shown (b) of FIG. 2, the variable valve lift apparatus may realize a low lift mode, and the intake valve 35 is opened and closed according to rotation of the low lift cam 311. In this case, the outer tappet body 322 does lost motion.

Hereinafter, detection method for malfunction of the intake valve 35 by detecting vibration signal generated in closing of the intake valve 35.

Naturally, the detection method may be applied to detect malfunction of the exhaust valve 36 by detecting vibration signal generated in closing of the exhaust valve 36.

Figure 3:
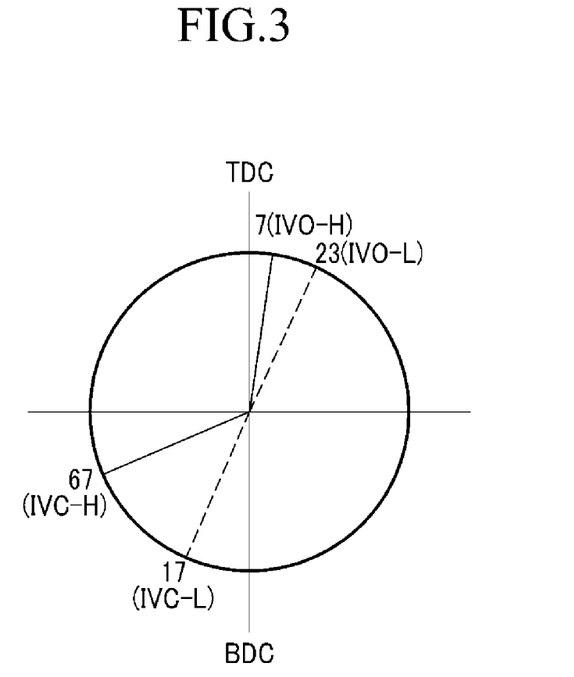
FIG. 3 is a drawing showing valve closing/opening time of an intake valve of which of which a system and a method for detecting operation error according to an exemplary embodiment of the present invention may be applied thereto.

FIG. 3 is a drawing showing valve closing/opening time of an intake valve of which of which a system and a method for detecting operation error according to an exemplary embodiment of the present invention may be applied thereto.

Referring to FIG. 3, for example opening angle (IVO-L) of the intake valve 35 in the low lift mode which depicts opening time of the intake valve 35 may be 23 degree from a top dead center TDC.

For example closing angle (IVC-L) of the intake valve 35 in the low lift mode which depicts closing time of the intake valve 35 may be 17 degree from a bottom dead center BDC.

For example opening angle (IVO-H) of the intake valve 35 in the high lift mode which depicts opening time of the intake valve 35 may be 7 degree from the top dead center TDC.

For example closing angle (IVC-H) of the intake valve 35 in the high lift mode which depicts closing time of the intake valve 35 may be 67 degree from the bottom dead center BDC.

If the top dead center TDC corresponds to 0 degree of crank angle 0, the bottom dead center BDC corresponds to 180 degree of the crank angle.

In the low lift mode, the intake valve 35 is closed at 197 degree of the crank angle, and the intake valve 35 is closed at 247 degree of the crank angle in the high lift mode.

When the intake valve 35 is closed, impact between the intake valve 35 and a valve seat generates vibration.

So, the control portion 10 detects whether the vibration occurs at the crank angle 197 degree or the crank angle 247 degree using the vibration sensor 20, and then determines the variable valve lift apparatus is operated in the low lift mode or in the high lift mode.

That is, the control portion 10 detects the vibration signal at the first crank angle of which the intake valve 35 is closed in the low lift mode or at the second crank angle of which the intake valve 35 is closed in the high lift mode, and then determines the operation mode of the variable valve lift apparatus.

While the variable valve lift apparatus is operated in the low lift mode under a low load condition or relatively low vehicle speed, the vibration signal may be detected near the crank angle 247. In this case, the control portion 10 determines the malfunction of the variable valve lift apparatus.

On the contrary, while the variable valve lift apparatus is operated in the high lift mode under a high load condition or relatively high vehicle speed, the vibration signal may be detected near the crank angle 197. In this case, the control portion 10 determines the malfunction of the variable valve lift apparatus.

Figure 4:
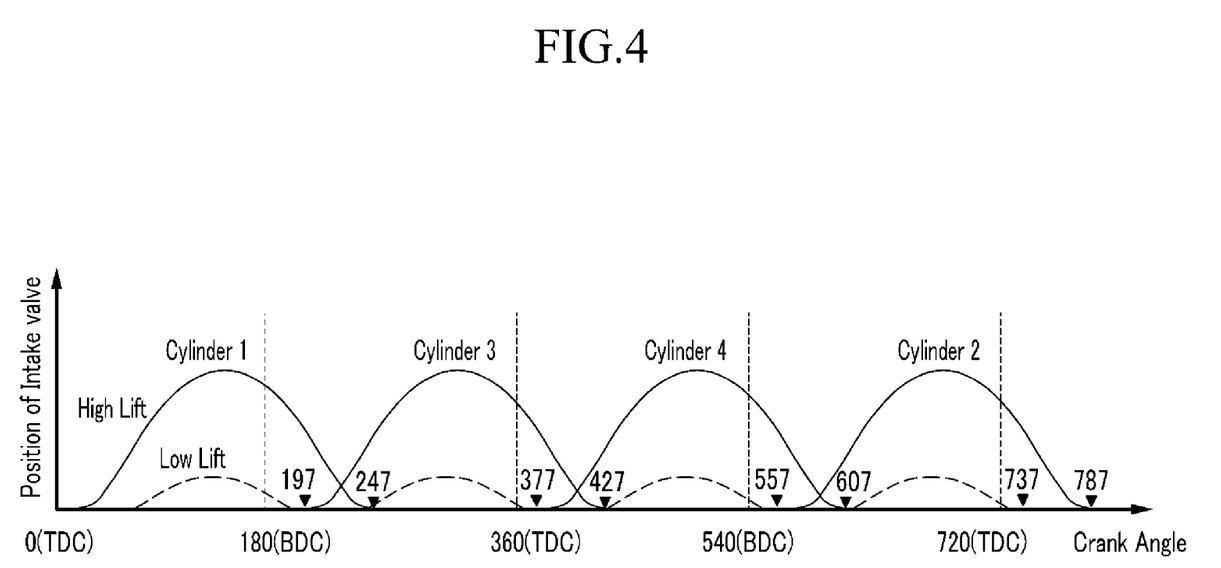
FIG. 4 is a graph showing positions of an intake valve of a four-cylinder and four-stroke engine of which of which a system and a method for detecting operation error according to an exemplary embodiment of the present invention may be applied thereto.

FIG. 4 is a graph showing positions of an intake valve of a four-cylinder and four-stroke engine of which of which a system and a method for detecting operation error according to an exemplary embodiment of the present invention may be applied thereto.

Table 1 shown below depicts strokes of a four-cycle and four-stroke engine,

TABLE 1

| first cylinder | second cylinder | third cylinder | fourth cylinder |
|---|---|---|---|
| intake | compress | exhaust | explosion |
| compress | explosion | intake | exhaust |
| explosion | exhaust | compress | intake |
| exhaust | intake | explosion | compress |

Orders of the explosion or power stroke of each cylinder of the engine are as-the first cylinder-the third cylinder-the fourth cylinder-the second cylinder. Orders of the intake stroke of each cylinder of the engine are also as-the first cylinder-the third cylinder-the fourth cylinder-the second cylinder.

That is, as shown in FIG. 4, the opening and closing of the intake valves are the first cylinder-the third cylinder-the fourth cylinder-the second cylinder in sequence.

If the top dead center TDC is the crank angle 0, the closing angle of the intake valves are as the first cylinder is 197 degree, the third cylinder is 377 degree, the fourth cylinder is 557 degree, and the second cylinder is 737 degree in the low lift mode.

And the closing angle of the intake valves are as the first cylinder is 247 degree, the third cylinder is 427 degree, the fourth cylinder is 607 degree, and the second cylinder is 787 degree in the high lift mode.

In normal condition, the vibration due to the impact between the intake valve and the valve seat at the closing angles of the intake valves. That is, the vibration peaks detected by the vibration sensor 20 are detected at the different crank angles in the low lift mode and the high lift mode.

Figure 5:
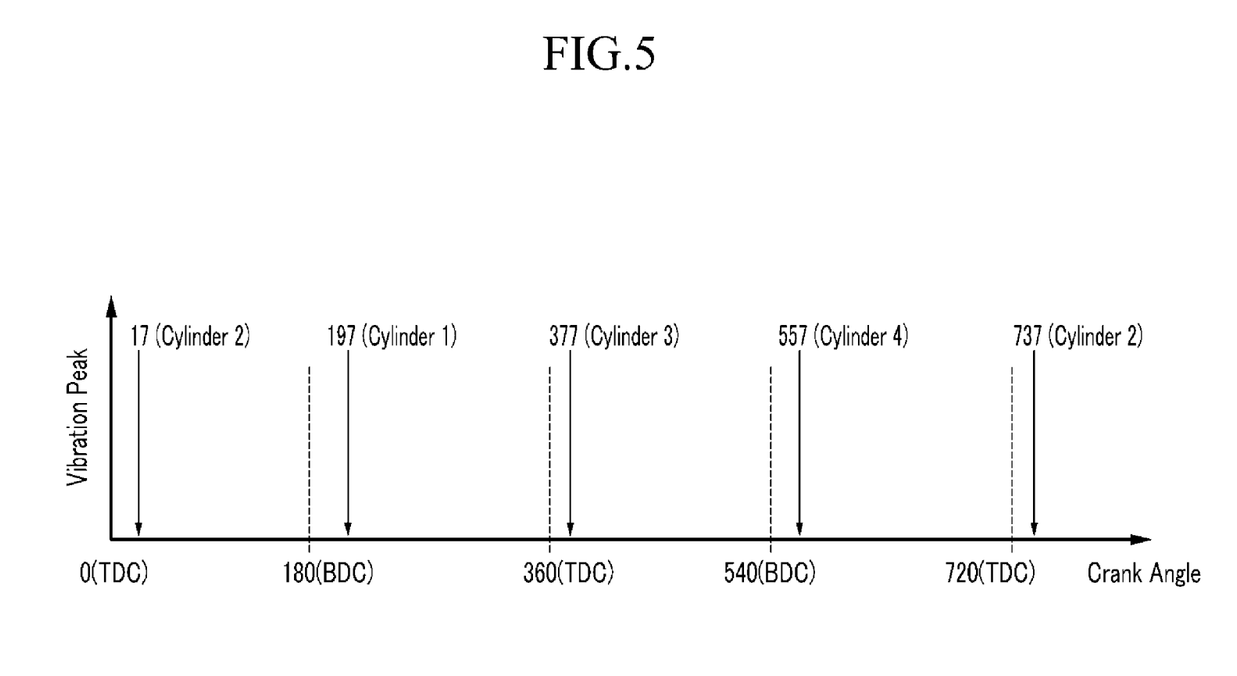
FIG. 5 is a graph showing positions of vibration peak of an intake valve in low lift mode according to an exemplary embodiment of the present invention.
Figure 6:
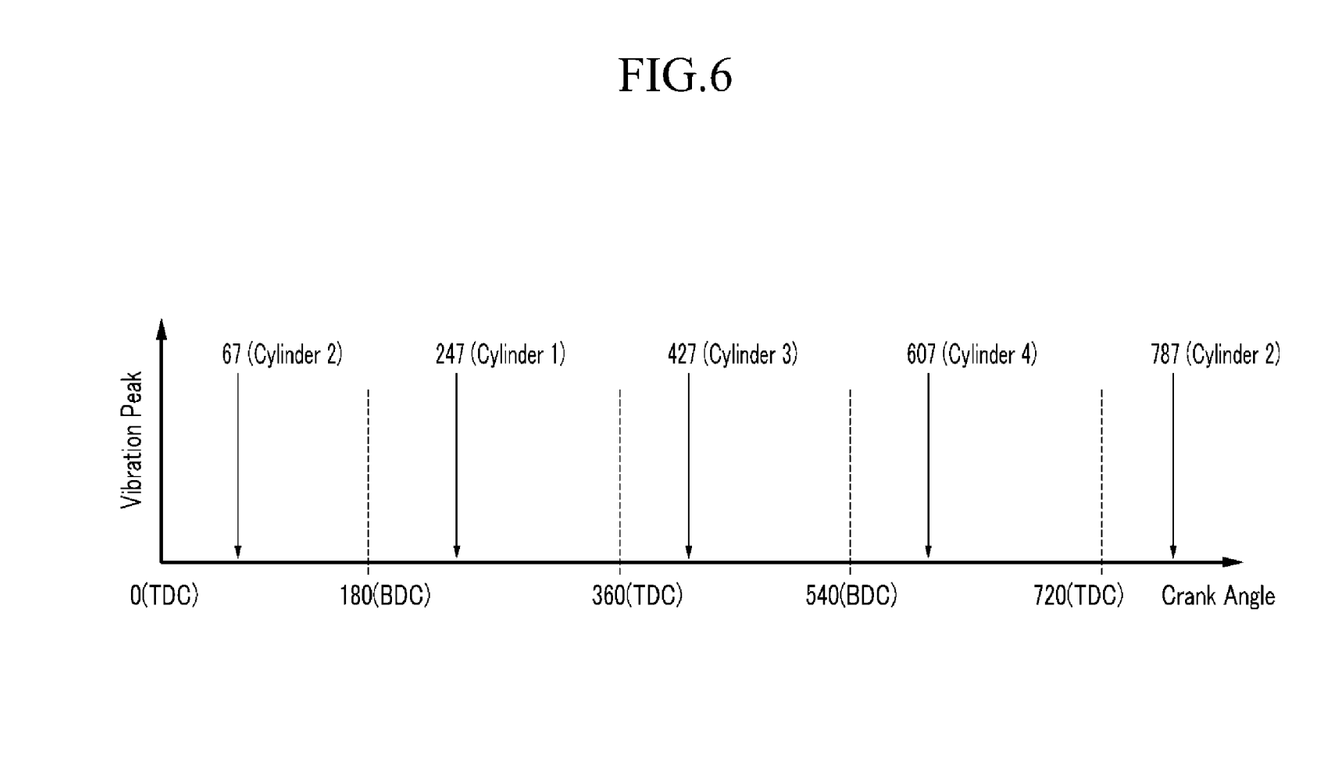
FIG. 6 is a graph showing positions of vibration peak of an intake valve in high lift mode according to an exemplary embodiment of the present invention.

Example vibration peaks generated in the low lift mode are shown in FIG. 5, and example vibration peaks generated in the high lift mode are shown in FIG. 6.

FIG. 5 is a graph showing positions of vibration peak of an intake valve in low lift mode according to an exemplary embodiment of the present invention.

Referring to FIG. 5, in the normal condition, the control portion 10 detects the vibration peaks at the crank angle 17 degree, 197 degree, 377 degree, and 557 degree in the low lift mode.

FIG. 6 is a graph showing positions of vibration peak of an intake valve in high lift mode according to an exemplary embodiment of the present invention.

Referring to FIG. 6, in the normal condition, the control portion 10 detects the vibration peaks at the crank angle 67 degree, 247 degree, 427 degree, and 607 degree in the high lift mode.

Figure 7:
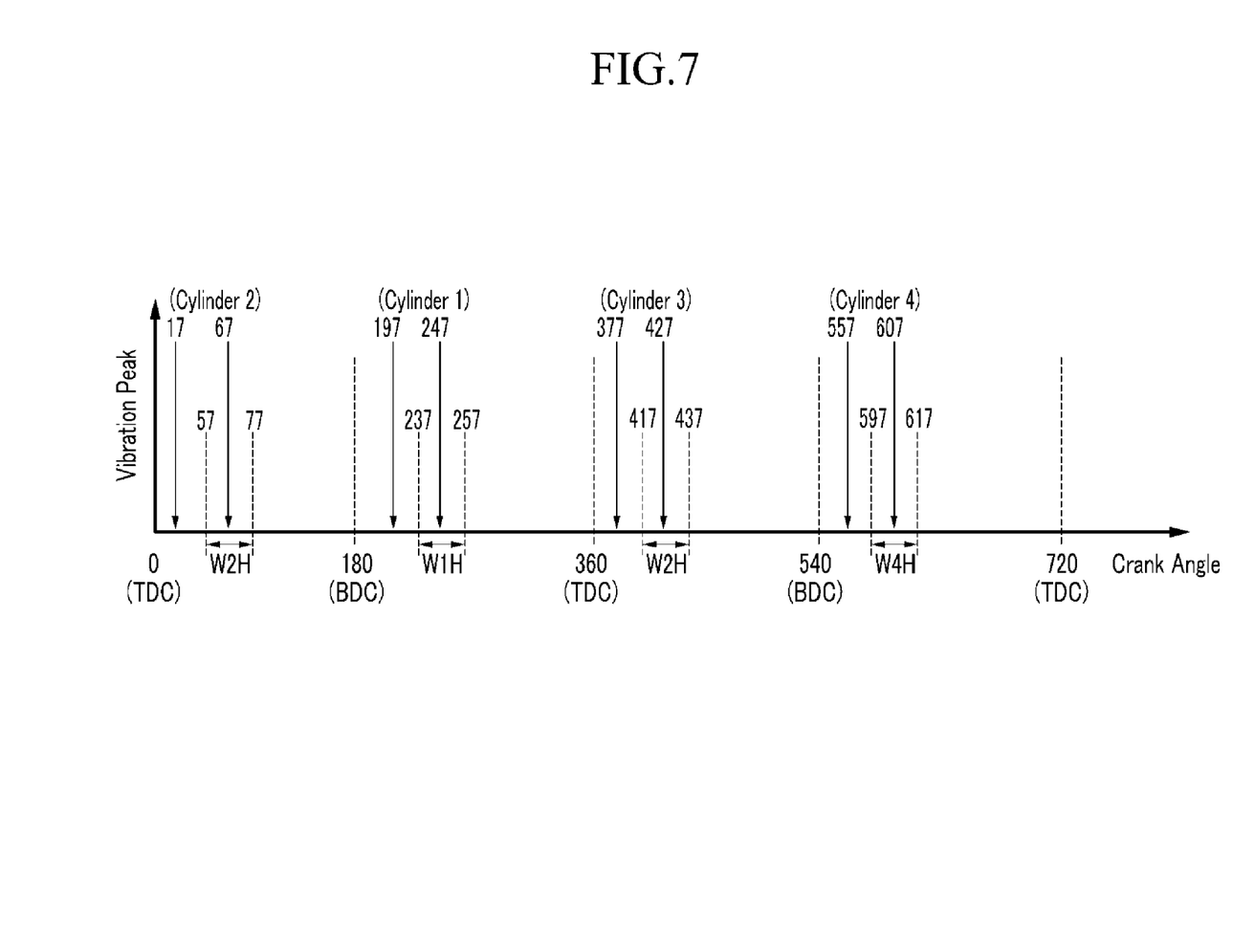
FIG. 7 is a graph showing detection windows in mode change from low lift mode to high lift mode according to an exemplary embodiment of the present invention.

FIG. 7 is a graph showing detection windows in mode change from low lift mode to high lift mode according to an exemplary embodiment of the present invention.

Referring to FIG. 7, when the operation mode of the variable valve lift apparatus is changed from the low lift mode to the high lift mode, generating positions of the vibration peaks are changed from the crank angles 17 degree, 197 degree, 377 degree and 557 degree to the crank angles 67 degree, 247 degree, 427 degree and 607 degree.

The control portion 10 predetermines detection windows for detecting the vibration peak in the high lift mode.

The detection window means predetermined ranges of the crank angles for detecting the vibration peak. That is, the detection windows are predetermined ranges of the crank angles including the closing angles of the intake valves.

As shown in the drawing, a second detection window W2H, which detects the vibration peak of the second cylinder in the high lift mode may be predetermined as the crank angle 57-77 degree as an example. A first detection window W1H, which detects the vibration peak of the first cylinder in the high lift mode may be predetermined as the crank angle 237-257 degree as an example. A third detection window W3H, which detects the vibration peak of the third cylinder in the high lift mode may be predetermined as the crank angle 417-437 degree as an example. A fourth detection window W4H, which detects the vibration peak of the fourth cylinder in the high lift mode may be predetermined as the crank angle 597-617 degree as an example.

As described above, the control portion 10 determines four detection windows W2H, W1H, W3H and W4H for detecting the vibration peaks in the high lift mode. If the control portion 10 cannot detect the vibration peak within each detection window W2H, W1H, W3H and W4H, the control portion 10 determines the malfunction of the variable valve lift apparatus.

If the vibration peak is not detected within one detection window of the four detection windows W2H, W1H, W3H and W4H, the control portion 10 determines the malfunction of the variable valve lift apparatus of one cylinder corresponding to the detection window. For example, if the vibration peak is not detected within the third detection window W3H, the control portion 10 determines that the intake valve of the third cylinder is not changed to the high lift mode normally.

Figure 8:
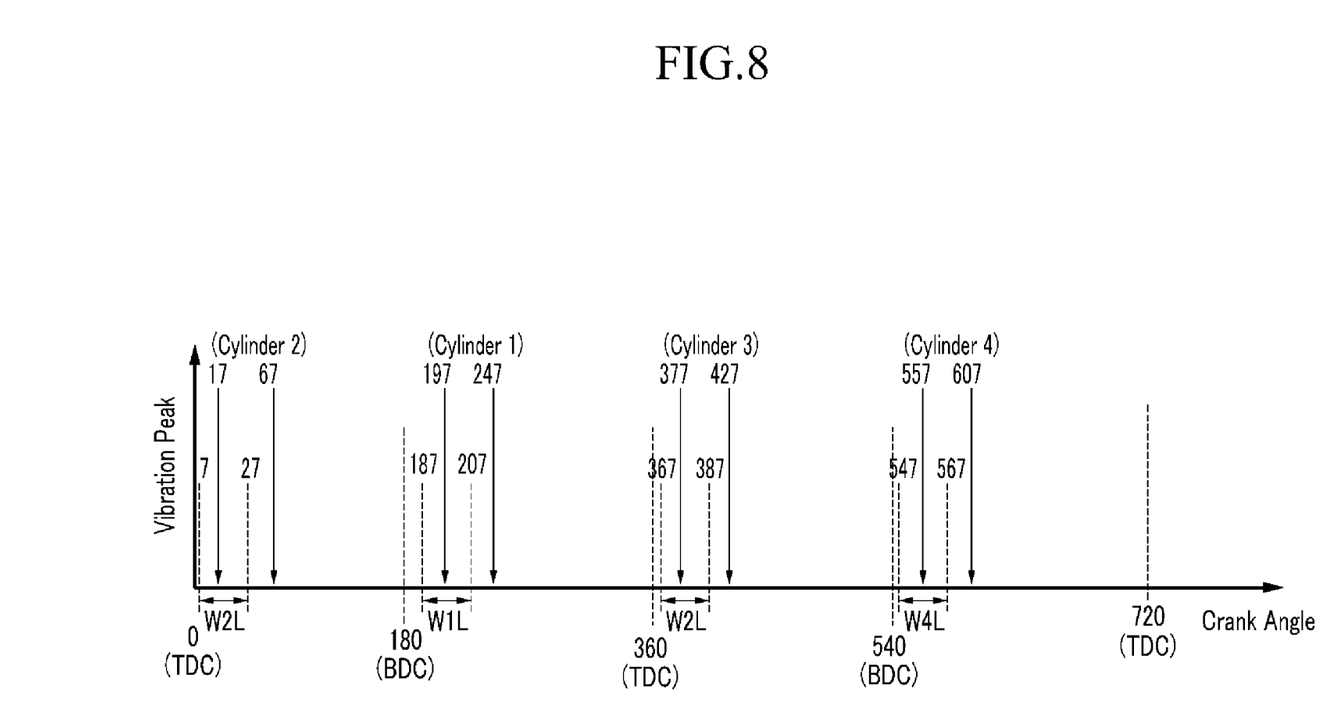
FIG. 8 is a graph showing detection windows in mode change from high lift mode to low lift mode according to an exemplary embodiment of the present invention.

FIG. 8 is a graph showing detection windows in mode change from high lift mode to low lift mode according to an exemplary embodiment of the present invention.

Referring to FIG. 8, when the operation mode of the variable valve lift apparatus is changed from the high lift mode to the low lift mode, generating positions of the vibration peaks are changed from the crank angles 67 degree, 247 degree, 427 degree, and 607 degree to the crank angles 17 degree, 197 degree, 377 degree and 557 degree.

The control portion 10 predetermines detection windows for detecting the vibration peak in the low lift mode.

As shown in the drawing, a second detection window W2L, which detects the vibration peak of the second cylinder in the low lift mode may be predetermined as the crank angle 7-27 degree as an example. A first detection window W1L, which detects the vibration peak of the first cylinder in the low lift mode may be predetermined as the crank angle 187-207 degree as an example. A third detection window W3L, which detects the vibration peak of the third cylinder in the low lift mode may be predetermined as the crank angle 367-387 degree as an example. A fourth detection window W4L, which detects the vibration peak of the fourth cylinder in the low lift mode may be predetermined as the crank angle 547-567 degree as an example.

As described above, the control portion 10 determines four detection windows W2L, W1L, W3L and W4L for detecting the vibration peaks in the low lift mode.

If the control portion 10 cannot detect the vibration peak within each detection window W2L, W1L, W3L and W4L, the control portion 10 determines the malfunction of the variable valve lift apparatus. For example, if the vibration peak is not detected within the third detection window W3L, the control portion 10 determines that the intake valve of the third cylinder is not changed to the low lift mode normally.

If the control portion 10 detects the vibration signal and a current operation mode of the variable valve lift apparatus and the vibration signal are not coincident, the control portion 10 may generate or output malfunction to warn a driver.

In an exemplary embodiment of the present invention, described each valve closing/opening time of the high lift mode and the low lift mode, each detection window and so on are described as exemplary embodiments. And thus various valve closing/opening times of the high lift mode and the low lift mode, detection windows and so on are determined for various engine types.

In an exemplary embodiment of the present invention, for better comprehension and ease of description, a four cylinder engine is described. However, the system and method for detecting malfunction of a variable valve lift apparatus may be applied to an engine provided with a variable valve lift apparatus.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for detecting malfunction of a variable valve lift apparatus comprising:
    an engine provided with the variable valve lift apparatus controlling lift of a valve;
    a vibration sensor which detects vibrations generated in closing of the valve and outputs corresponding vibration signals; and
    a control portion which receives the vibration signals and determines the malfunction of the variable valve lift apparatus according to the vibration signals to be detected within a predetermined crank angle.

2. The system of claim 1, wherein the vibration sensor is disposed to a cylinder head of the engine.

3. The system of claim 1, wherein the control portion detects one of vibration signals, of which the valve is closed within a first crank angle in a low lift mode and of which the valve is closed within a second crank angle in a high lift mode, and the control portion determines an operation mode of the variable valve lift apparatus.

4. The system of claim 3, wherein the control portion determines the malfunction of the variable valve lift apparatus when the one of the vibration signals corresponds to the second crank angle in the low lift mode.

5. The system of claim 3, wherein the control portion determines the malfunction of the variable valve lift apparatus when the one of the vibration signals corresponds to the first crank angle in the high lift mode.

6. The system of claim 1, wherein the valve is an intake valve.

7. The system of claim 1, wherein the valve is an exhaust valve.

8. A method for detecting malfunction of a variable valve lift apparatus comprising:
    changing mode of the variable valve lift apparatus from a first mode to a second mode;
    determining a detection window for detecting a vibration peak in the second mode;
    detecting the vibration peak in the detection window; and determining the malfunction of the variable valve lift apparatus according to whether the vibration peak is detected in the detection window or not, wherein the vibration peak is generated when a valve provided to the engine is closed, and wherein the detection window is predetermined as a crank angle of a crankshaft provided to the engine.

9. The method of claim 8, wherein the variable valve lift apparatus is determined to be in the malfunction when the vibration peak is not detected within the detection window.

10. The method of claim 8, wherein the first mode is a low lift mode and the second mode is a high lift mode.

11. The method of claim 8, wherein the first mode is a high lift mode and the second mode is a low lift mode.

12. The method of claim 8, wherein a plurality of detection windows are predetermined as a plurality of crank angles for detecting the vibration peaks of a plurality of valves provided to each cylinder of the engine.

13. The method of claim 8, wherein the vibration peak is detected by a vibration sensor mounted to a cylinder head of the engine.

14. The method of claim 8, wherein the valve is an intake valve.

15. The method of claim 8, wherein the valve is an exhaust valve.

* * * * *